United States Patent [19]

Torti et al.

[11] Patent Number: 4,589,944

[45] Date of Patent: May 20, 1986

[54] PROCESS AND APPARATUS FOR PRODUCING A STRIP OF CORRUGATED CARDBOARD

[75] Inventors: Mario Torti, Lyons; Bernard Capdeboscq, St Just Chaleyssin, both of France

[73] Assignee: S. A. Martin, Villeurbanne, France

[21] Appl. No.: 672,979

[22] Filed: Nov. 19, 1984

[30] Foreign Application Priority Data

Nov. 17, 1983 [FR] France ................................ 83 18280

[51] Int. Cl.[4] .................................................. B32B 1/00

[52] U.S. Cl. .................................... 156/359; 156/470; 156/499

[58] Field of Search ............ 156/470, 205, 208, 273.3, 156/308.9, 499, 359; 34/4, 41

[56] References Cited

U.S. PATENT DOCUMENTS

| | | | |
|---|---|---|---|
| 3,434,901 | 3/1969 | Griffiths et al. | 156/470 X |
| 3,841,935 | 10/1974 | Dicks et al. | 156/210 |
| 4,419,173 | 12/1983 | Akiyama et al. | 156/470 |

*Primary Examiner*—David Simmons

*Attorney, Agent, or Firm*—Pollock, Vande Sande & Priddy

[57] ABSTRACT

A process for producing a strip (4) of corrugated cardboard by gluing one or more sheets (8, 10) of single-face corrugated cardboard and a sheet (6) of covering paper. At least the corrugations of the upper sheet (10) are heated by means of an infra-red radiation panel (40), after the glue has been deposited on them in the gluer (1) and before the sheets come in contact with one another in the double-face machine (2).

6 Claims, 3 Drawing Figures

PROCESS AND APPARATUS FOR PRODUCING A STRIP OF CORRUGATED CARDBOARD

FIELD OF THE INVENTION

The present invention relates to the production of a strip of corrugated cardboard by gluing one or more sheets of single-face corrugated cardboard and a sheet of covering paper.

To make a strip of double-face or triple corrugated cardboard by means of gluing, a first machine, called "gluer", is used in the first place, and in this, on the one hand, the sheet of covering paper is preheated and, on the other hand, glue is deposited on the top of the corrugations of the sheet or of the two or three sheets of single-face corrugated cardboard. In a second machine, called "double-face", all these sheets are subsequently laid against one another, glued as a result of heating and then dried. The heat applied to the glue in the "double-face" machine causes the gelling of the starch and gluing of the cardboard.

PRIOR ART

The gluing and drying of the strips of corrugated cardboard in the "double-face" machine make it necessary to utilise and transfer heat energy. In the known machines, this heat transfer is effected as a result of the contact of the corrugated cardboard with heating tables, transmission taking place as a result of conduction.

These heating tables, usually supplied with heat by means of steam, have considerable thermal inertia. The transition from one temperature to another is relatively long and cannot match the variations in speed of the machines or the instantaneous changes in the type of cardboard to be produced, for example double-faced cardboard to double/double cardboard.

Moreover, since the heat energy is transferred by conduction, it is:

- fairly easy to execute the gluing of a single-face cardboard to a covering paper in order to produce double-face cardboard,
- more difficult, for the production of double/double cardboard, to execute the gluing of two single-face cardboards to one another, since it is necessary to heat sufficiently the tops of the corrugations of the upper single-face cardboard,
- even more difficult, for the production of triple cardboard, to execute the gluing of three single-face cardboards to one another.

At the present time, double/double and triple cardboards are produced by reducing the speed of the machine and increasing in the pressure between the product and the heating tables. These two actions take place to the detriment of the quantity of cardboard produced, on the one hand, and the quality of the product obtained, on the other hand.

Furthermore, after drying, passage over the heating tables causes bending of the cardboard, attributed to the difference in humidity which necessarily occurs between the very hot and dry lower part of the cardboard, since this is in direct contact with the heating tables, and its upper part, which collects all the humidity which was originally contained in the cardboard and which has been displaced upwards.

SUMMARY OF THE INVENTION

The invention proposes to mitigate all these disadvantages by means of a process which makes it possible to apply a glue pregelling energy at least to the upper sheets of single-face cardboard, after the glue has been deposited on them and before the sheets come in contact with one another in the double-face machine, thus confining the gelling energy to the center of the product. This pregelling energy is provided by means of radiation, preferably by means of infrared radiation. In fact, this method of heating has the advantages that it does not require any vector material to convey the energy to be transmitted, it penetrates and has very low thermal inertia, it can be regulated precisely, and it also makes it possible to regulate the humidity profile over the width of the cardboard obtained at the outlet of the double-face machine.

The invention therefore relates to a process for producing a strip of corrugated cardboard by gluing a first sheet of cardboard, having corrugations on one of its faces, to a second plane sheet of covering paper or cardboard having a plane face, process according to which glue is first deposited on the tops of the said undulations of the first sheet, in order subsequently to lay them on the said second plane sheet, the said process being defined, according to the invention, in that it also involves heating the tops of the said corrugations of the first sheet by means of radiation, preferably by means of infra-red radiation, after glue has been deposited on them and before these two sheets come into contact.

The invention likewise relates to an apparatus for carrying out this process, of the type comprising a first machine, called "gluer", in which glue is deposited on the tops of the said corrugations of the first sheet, followed by a second machine, called "double-face", which ensures that the two sheets are brought into contact and carries out their final gluing. According to the invention, such an apparatus is defined in that it also incorporates, between these two machines, at least one radiant panel, preferably an infra-red radiation panel, directed towards the said corrugations of the first sheet.

BRIEF DESCRIPTION OF THE DRAWINGS

The invention will be understood better by means of the following description of a non-limiting exemplary embodiment used to produce a strip of "double/double" corrugated cardboard, with reference to the attached drawings in which.

DETAILED DESCRIPTION

Figure 1:
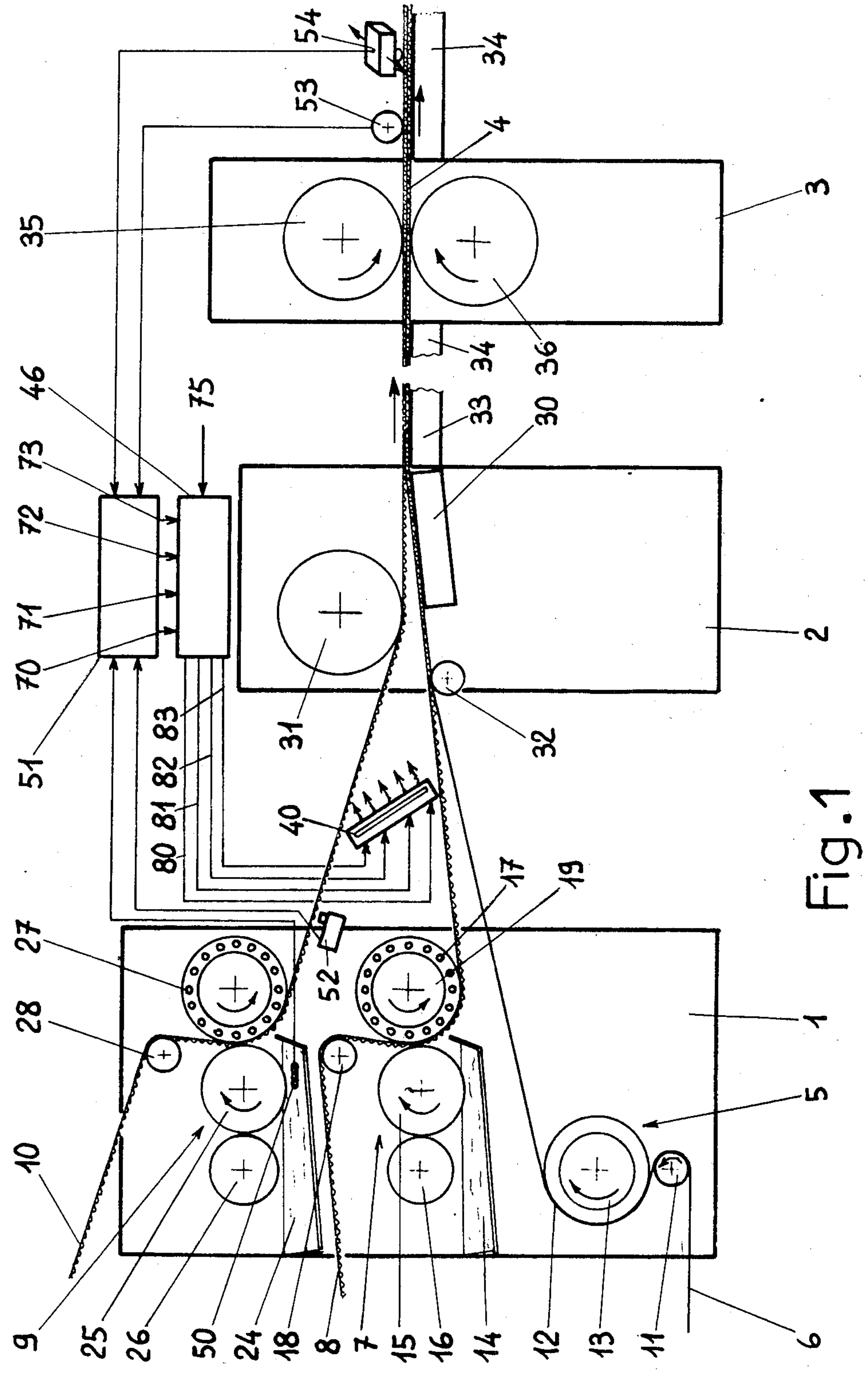
FIG. 1 is a general diagrammatic view of the apparatus of the invention.

In FIG. 1, reference 1 denotes a conventional "gluer" machine for double/double cardboard, followed by a conventional "double-face" machine, reference 2 of which designates the inlet frame, in which the various sheets are laid on one another, and reference 3 of which denotes the outlet frame called the "traction frame", which drives the sheet 4 of double/double cardboard produced by means of traction.

In a very conventional way, the gluer machine 1 comprises a station 5 for preheating the sheet 6 of covering paper, a station 7 for coating the first sheet 8 of single-face corrugated cardboard with glue, and a station 9 for coating the second sheet 10 of single-face corrugated cardboard with glue.

The station 5 comprises a guide roller 11 followed by a smooth roller 12, the hollow inner space 13 of which is heated by saturated steam.

The station 7 possesses a tank 14 containing glue containing approximately 20% solids and at a temperature of approximately 30° C., and a gluing roller 15 which dips into the glue tank 14 and which rotates continuously in the direction indicated by the arrow. The glue is picked up from the tank 14 by the roller 15 in a thickness set by means of the adjustable center-to-center distance existing between the roller 15 and the auxilliary roller 16 called a doctor roller. It is deposited by means of the cylinder 15 on the tops of the corrugations of the sheet 8 of single-face cardboard, this sheet being brought into position by means of a guide pulley 18 and maintained in position during the coating of the glue by means of a retaining roller 17, the latter roller being a smooth suction roller of a type such as that described in French Pat. No. 2,479,871, the hollow inner space 19 of which is heated by saturated steam.

The upper glue-coating station 9 is identical in all respects to the glue-coating station 7 and therefore comprises a glue tank 24, and applicator roller 25, a doctor roller 26, a guide roller 28 for the upper sheet 10, and a smooth suction roller 27.

The sheets 8 and 10 of single-face cardboard thus leave the gluer 1 with the peaks of their corrugations covered with glue, and the sheet of covering paper 6 leaves it preheated to a temperature of approximately 60° C. In a conventional way, these three sheets are subsequently laid on one another in the inlet frame 2 of the double-face machine, this frame being equipped with guide rollers 31 and 32 and a first table 30 heated by means of saturated steam. The three sheets, then joined together into a strip 4 of double double cardboard, travel in the double-face machine on other heating tables 33, 34 and leave the traction frame 3 in the form of glued and dried double/double cardboard. The drive and traction rollers 35, 36 for the strip 4, which equip the outlet frame 3 of the double-face machine, can be seen in the drawing.

Figure 2:
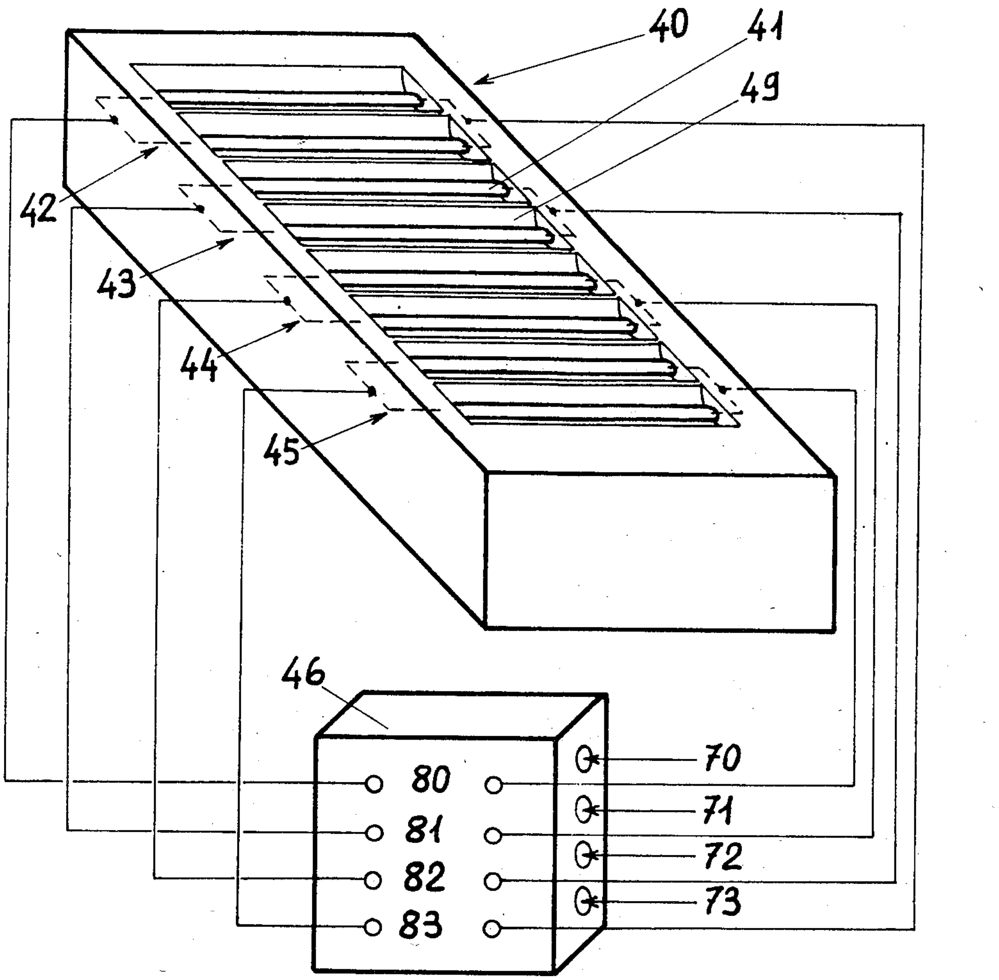
FIG. 2 is perspective view of the radiant panel which equips the apparatus of FIG. 1, together with its electrical-power supply box.

According to the invention, a radiant panel 40 equipped, as may be seen in FIG. 2, with infra-red radiation tubes 41 is located between the sheets 8 and 10 after the gluer 1 and before the inlet frame 2 of the double-face machine and is directed towards the corrugations of the sheet 10, as indicated diagramatically in FIG. 1. In this way, energy for pregelling the glue covering the peaks of the corrugations of the sheet 10 is applied, the temperature of this glue being raised approximately 30° Celsius. The final gluing under the action of the heating tables 33, 34 of the double-face machine is then made much easier, because these heating tables now have to supply only very little heating energy to the upper sheet 10 to ensure that gluing and drying can take place.

The heating power irradiated by the panel 40 must be the higher, the lower the initial temperature of the glue deposited at the upper glue-coating station 9, the higher the speed of passage of the cardboard and the greater the quantity of glue deposited on the peaks of the sheet 10. It is therefore advantageous to make this radiated power variable as desired, as a function of these three parameters.

Moreover, it often happens that the humidity profile over the width of the cardboard strip 4 leaving the double-face machine is not perfectly uniform. According to a particularly original characteristic of the invention, it is possible to use the radiant panel 40 not only to apply pregelling energy to the glue, but also, because the infra-red rays in actual fact heat the entire strip of single-face cardboard 10, to make uniform the humidity profile of the strip 4 of double/double cardboard produced. To achieve this twofold aim, the panel 40 is divided into four sectors 42, 43, 44, 45 (FIG. 2), which are separately supplied with electrical energy by means of a power unit 46, according to powers which are adjusted as a function of the humidity profile measured across the strip 40 at the outlet of the double-face machine.

As indicated diagramatically in FIG. 1, the apparatus according to the invention therefore also incorporates:

- a probe 50, such as a thermocouple, located in the glue tank 24 and supplying a computer 51 with information representing the temperature of the glue contained in the tank 24,
- a humidity sensor 52 supplying the computer 51 with information representing the quantity of glue per square meter deposited on the peaks of the corrugations of the sheet 10,
- a coding wheel 53 supplying the computer 51 with information representing the speed of passage of the product,
- another humidity sensor 54 which moves across the strip 4 in a continuous to-and-fro movement which supplies the computer 51 with information representing the humidity profile over the width of the strip 4.

Figure 3:
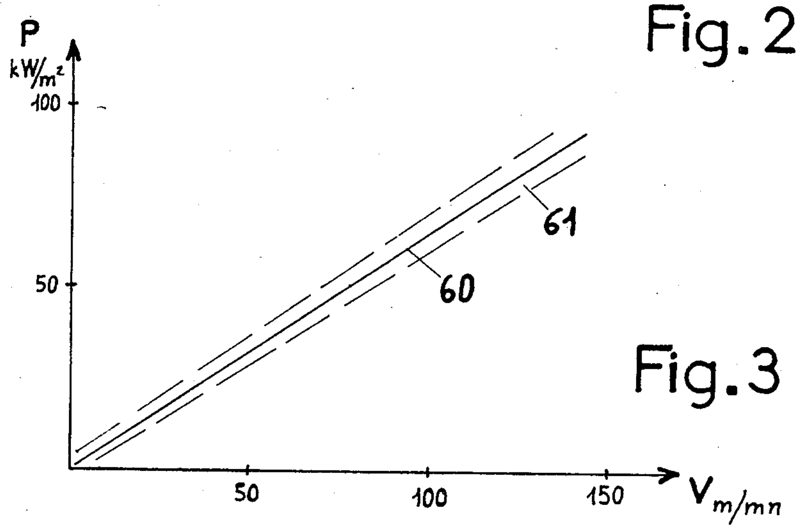
FIG. 3 is a graph showing the electrical power to be transmitted to the radiant elements of FIG. 2.

The electrical power to be applied to the panel 40 has been determined experimentally in advance as a function of these four parameters and is represented, for example, by the curve 60 in FIG. 3, which gives the electrical power in kW/m2 as a function of the speed of passage of the cardboard in m/min for a given quantity of glue and glue temperature, with a zone 61 of adjustment of this power according to the humidity over the width of the strip 4. There is, of course, also a curve 60 plotted according to the value of the quantity of glue coated per square meter and the value of the glue temperature.

As a function of these data, the computer 51 supplies four output information items 70, 71, 72, 73 which are applied to the unit 46 fed with 220-volt single-phase electrical voltage at 75 and equipped with power variators with thyristors controlled by the outputs 70 to 73 of the computer. The variators supply at 80, 81, 82, 83 the electrical supply voltages for each of the sectors 42 to 45 of the radiant panel 40. The electrical power supplied for each of these sectors is given by the curve 60 of FIG. 3, which represents its average value adjusted in the zone 61 as a function of the value of the humidity profile of the product 4 measured at the outlet of the double-face machine.

The invention is, of course, not limited to the exemplary embodiment which has just been described. In addition to the panel 40 radiating towards the corrugations of the sheet 10, there could also be another panel radiating towards the plane face of the sheet 8, and this would make it possible to preheat this face even better. This effect could also be obtained using omnidirectional elements 41 for the panel 40, which would not only radiate upwards, as in FIG. 1, but also downwards. It would then be necessary to remove the reflectors 49 associated with each of the infra-red tubes 41. The gap existing in the space 1 to 2 between the sheets 8 and 6 could also be provided with one or more radiant panels. Other means of radiation (micro-waves, ultraviolet, etc) could be used instead of the infra-red radiation or together with the latter, although infra-red radiation is still preferred because of its effectiveness and its low cost price.

We claim:

1. An apparatus for producing a strip of corrugated cardboard consisting of two sheets of corrugated paper and at least a sheet of covering paper comprising (a) a first machine (1) or gluer;

(b) a second machine (2, 3) or double face which ensures that said sheets of paper are brought into contact;

(c) a radiant panel (40) located between said two sheets of corrugated paper;

(d) said panel being supplied with electrical power via at least one power variator device (46);

(e) a processing device (51) controlling said power variator;

(f) a first device (50) providing information to said processing device, said device measuring the temperature of the glue coated on the said corrugations;

(g) a second device (52) measuring the quantity of glue deposited on the said corrugations;

(h) a third device measuring the speed of passage of the cardboard in the machine; and (i) means to transmit information from said first, second and third devices to said processing device.

2. An apparatus as claimed in claim 1, wherein said processing device also receives information coming from a device (54) measuring the humidity profile over the width of said strip and of the cardboard produced at the outlet of said "double-face" machine.

3. An apparatus as claimed in claim 2, wherein at least one radiant panel directed towards the corrugations of a first of said sheets is divided into several sectors (42 to 45) supplied separately with electrical power as a function of the measurement of said humidity profile and so as to make the latter uniform.

4. An apparatus as claimed in claim 1, wherein said radiant panel is an infra-red radiation panel.

5. An apparatus as claimed in claim 1, comprising upstream of said "double-face" machine, at least one other radiant panel directed towards said plane face of a second of said sheets.

6. An apparatus as claimed in claim 5, wherein said other radiant panel is an infra-red radiation panel.

* * * * *